(12) United States Patent
Murata

(10) Patent No.: US 6,232,678 B1
(45) Date of Patent: *May 15, 2001

(54) ELECTRONIC APPLIANCE

(75) Inventor: Makoto Murata, Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,120

(22) Filed: Jan. 7, 1999

(30) Foreign Application Priority Data

Jan. 28, 1998 (JP) .................................................. 10-015456

(51) Int. Cl.[7] .................................................. H01H 35/00
(52) U.S. Cl. ............................................. 307/130; 307/38
(58) Field of Search .................................... 307/112, 116, 307/125, 130, 139, 140, 142, 126, 12, 38; 395/750.03, 750.06; 713/320, 310

(56) References Cited

U.S. PATENT DOCUMENTS 5,565,714 * 10/1996 Cunningham .......................... 307/112
5,747,973 * 5/1998 Robitaille et al. ....................... 307/39

* cited by examiner

*Primary Examiner*—Stephen W. Jackson
*Assistant Examiner*—Sharon Polk
(74) *Attorney, Agent, or Firm*—Arent Fox Kintner Plotkin & Kahn, PLLC

(57) ABSTRACT

An electronic appliance, in addition to being of the type that is connected to another electronic appliance by way of a signal line and that permits the other electronic appliance to recognize establishment of connection between them on the basis of the voltage level on the signal line, allows this voltage level to be varied with the signal line kept connected. A signal terminal for connecting the signal line and a supplied-power line for supplying a voltage having a predetermined level are connected through a pull-up resistor and a transistor connected in series. The transistor is controlled by a controller so that, even after the electronic appliance starts receiving electric power, the transistor will be kept in a non-conducting state and thus the voltage on the supplied-power line will not be supplied to the signal terminal until the operation of various portions of the electronic appliance has been stabilized. The transistor may be controlled by being fed with a control signal from the outside.

15 Claims, 4 Drawing Sheets

ELECTRONIC APPLIANCE

BACKGROUND OF THE INVENTION

1. Field of the Invention

The present invention relates to an electronic appliance that is connected to another electronic appliance by way of a signal line, and more particularly to an electronic appliance that permits another electronic appliance to recognize establishment of connection between the two electronic appliances by applying a predetermined voltage through a pull-up or pull-down resistor to a signal line connecting the two electronic appliances.

2. Description of the Prior Art

An electronic appliance of the type that is connected to another electronic appliance by way of a signal line is often designed to detect establishment of connection between the two electronic appliances by checking the voltage level on the signal line. Typically, the voltage level to be checked for is set, by the addition of a pull-up or pull-down resistor to the signal line, to be equal to the level of the supplied voltage, the level of ground, or a predetermined level somewhere between these two levels.

FIG. 4 illustrates the outline of a conventional circuit design of an electronic appliance of the type that is connected to another electronic appliance by way of a signal line. This figure illustrates how a first electronic appliance 8 recognizes establishment of connection with a second electronic appliance 9 that is achieved by way of a signal line 7. The first electronic appliance 8 has a terminal 81 to which one end of the signal line 7 is connected, a detection circuit 82 that monitors the voltage level at the terminal 81, and a resistor 83 that connects the terminal 81 to a predetermined voltage level. The second electronic appliance 9 has a terminal 91 to which the other end of the signal line 7 is connected, a supplied voltage line 92 that supplies a voltage having a predetermined voltage level Vdd, and a pull-up resistor 93 through which the supplied voltage line 92 is connected to the terminal 91.

Before the signal line 7 is connected between the terminals 81 and 91, the voltage level detected by the detection circuit 82 is equal to the voltage level to which the resistor 83 is connected; for example, it is equal to the ground level. As soon as the signal line 7 is connected between the terminals 81 and 91, the voltage level detected by the detection circuit 82 becomes approximately equal to the predetermined voltage level Vdd, and this causes the electronic appliance 8 to recognize establishment of connection with the electronic appliance 9.

However, according to the circuit design of the second electronic appliance 9 above, the pull-up resistor 93 keeps the terminal 91 and the supplied voltage line 92 connected all the time; accordingly, connecting the signal line 7 between the terminals 81 and 91 is always accompanied by the appearance of the predetermined voltage level Vdd at the terminal 81. That is, establishing physical connection between the two electronic appliances 8 and 9 by way of the signal line 7 is equivalent to establishing logical connection between them that can be detected as the presence of the predetermined voltage level Vdd on the signal line 7. As a result, in cases where the electronic appliance 8 is designed to start a predetermined sequence of operations as soon as it is connected to the electronic appliance 9, or in cases where the electronic appliance 8 is designed to repeat a predetermined sequence of operations as long as it is connected to the electronic appliance 9, there is no other way to start or stop such a sequence of operations in the electronic appliance 8 than to connect or remove the signal line 7 physically.

For example, in a case where the electronic appliance 8 is designed to transmit a signal to the electronic appliance 9 immediately or only a short while after establishment of connection between them, it is only after the electronic appliance 9 has become ready for operation that connection can be established between the two electronic appliances 8 and 9 by way of the signal line 7. A premature attempt to establish connection before the electronic appliance 9 becomes ready for operation results in loss of the signal. Moreover, if an error occurs in the electronic appliance 9 while the electronic appliance 8 is transmitting a signal, the transmission of the signal by the electronic appliance 8 cannot be stopped in any other way than to remove the signal line 7 from the terminal 81 or 91. Since a terminal for connecting such a signal line is typically located at the back of an electronic appliance, connection or removal of the signal line tends to be troublesome, and thus leads to less efficient use of the electronic appliance.

SUMMARY OF THE INVENTION

An object of the present invention is, in an electronic appliance of the type that is connected to another electronic appliance by way of a signal line and that permits the other electronic appliance to recognize establishment of connection between the two electronic appliances on the basis of the voltage level that appears on the signal line, to make it possible to vary the voltage level with the signal line kept connected.

To achieve the above object, according to the present invention, in an electronic appliance that is provided with a signal terminal for connecting a signal line for connection to another electronic appliance, a constant voltage source for supplying a predetermined voltage, and a pull-up or pull-down resistor for connecting the signal terminal to the constant voltage source and that permits said other electronic appliance to recognize establishment of connection between them by applying the predetermined voltage to the signal terminal, a switch circuit is additionally provided between the pull-up or pull-down resistor and the signal terminal or the constant voltage source. This switch circuit, by being brought into a conducting state or a nonconducting state, serves to turn on or off the application of the predetermined voltage to the signal terminal.

Even if the electronic appliance is connected to the other electronic appliance physically by the signal line, unless the switch circuit is brought into a closed state and thereby the pull-up or pull-down resistor is connected to the signal terminal or the constant voltage source, the predetermined voltage is not applied to the signal line. The other electronic appliance recognizes this state as there being no connection by way of the signal line. In this way, it is possible to create a "logically disconnected" state while keeping the two electronic appliances "physically connected" by the signal line.

The operation of the switch circuit may be controlled by a control circuit provided within the electronic appliance, or may be controlled by feeding the switch circuit with a control signal from the outside. For example, if the switch circuit is controlled by the use of a control circuit that brings it into a closed state as late as a predetermined length of time after the electronic appliance has started receiving electric power, it is possible to keep the other electronic appliance unaware of establishment of connection until the first electronic appliance completes its initial operations, and thus it is possible to let the other electronic appliance start, with appropriate timing, a sequence of operations that should be performed after the completion of the initial operations on the part of the first electronic appliance.

On the other hand, if the switch circuit is so controlled as to be brought into an open state when it receives a control signal from the outside, even a sequence of operations that is supposed to be performed when the electronic appliance is not connected to the other electronic appliance can be performed without the need to remove the signal line. After the completion of such a sequence, the logically connected state can be restored immediately by feeding the switch circuit with another control signal that brings it into a closed state.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
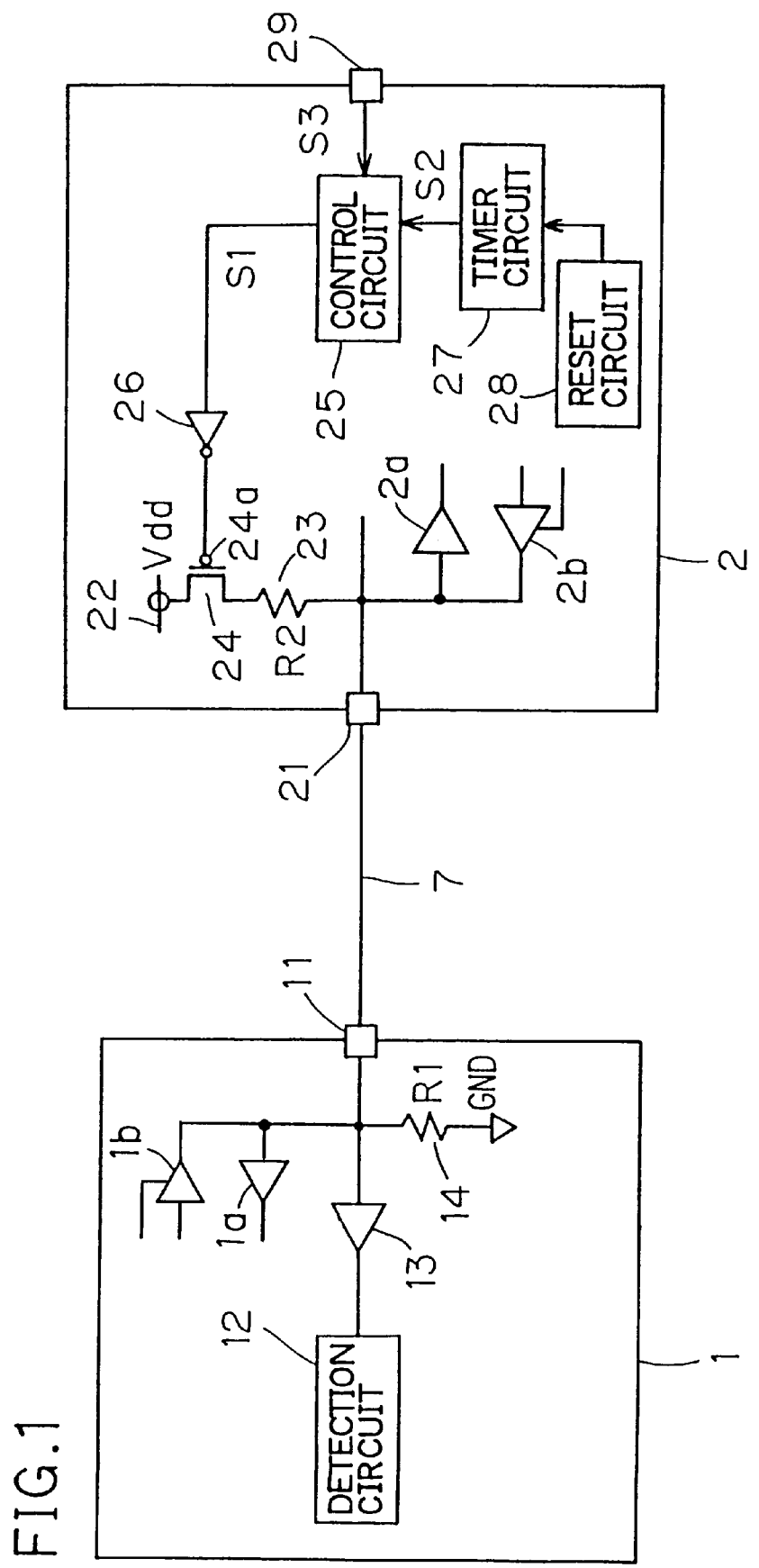
FIG. 1 is a diagram schematically illustrating the outline of the circuit design of the electronic appliance of a first embodiment of the invention.

Hereinafter, electronic appliances embodying the present invention will be described with reference to the attached drawings. FIG. 1 shows the outline of the circuit design of the electronic appliance of a first embodiment of the invention. A first electronic appliance 1 is connected to a second electronic appliance 2, which embodies the invention, by way of a detachable signal line 7.

The first electronic appliance 1 has a signal terminal 11 to which one end of the signal line 7 is connected, a detection circuit 12 that monitors the voltage level at the signal terminal 11, a buffer 13 that feeds the voltage level at the signal terminal 11 to the detection circuit 12, and a pull-down resistor 14 that has one end connected to the signal terminal 11 and has the other end grounded. The electronic appliance 1 also has an input buffer 1a that supplies two-level input signals it receives from the second electronic appliance 2 via the signal terminal 11 to an input signal processing circuit (not shown), and an output buffer 1b that transmits to the second electronic appliance 2 via the signal terminal 11 two-level output signals supplied by an output signal generating circuit (not shown). The output buffer 1b is set in a high-impedance state while no output data is transmitted.

The second electronic appliance 2 has a signal terminal 21 to which the other end of the signal line 7 is connected, a supplied voltage line 22 that supplies a voltage having a predetermined voltage level Vdd, a pull-up resistor 23 that has one end connected to the signal terminal 21 and has the other end connected to the supplied voltage line 22, and a field-effect transistor 24 that is connected between the supplied voltage line 22 and the pull-up resistor 23. The pull-up resistor 23 is connected to the supplied voltage line 22 only when the transistor 24 is conducting. The resistance R2 of the pull-up resistor 23 is set to be far lower than the resistance R1 of the pull-down resistor 14 of the first electronic appliance 1 such that $$R1 >> R2 \tag{1}$$

The electronic appliance 2 further has a control circuit 25 that controls the operation of the transistor 24 by feeding thereto a control signal S1, an inverter circuit 26 that inverts the control signal Si obtained from the control circuit 25 and feeds it to the gate terminal 24a of the transistor 24, a timer circuit 27 that feeds the control circuit 25 with a control signal S2 that determines the timing with which the control circuit 25 performs its control operation, a reset circuit 28 that instructs the timer circuit 27 to start its operation, and a control terminal 29 for receiving a control signal S3 fed from the outside so as to be fed to the control circuit 25. Each of the control signals S1, S2, and S3 takes either a high level (hereafter referred to simply as H level) or a low level (hereafter referred to simply as L level) at a time. Normally, the control signal S3 is kept at H level.

The electronic appliance 2 also has an input buffer 2a that supplies two-level input signals it receives from the first electronic appliance 1 via the signal terminal 21 to an input signal processing circuit (not shown), and an output buffer 2b that transmits to the first electronic appliance 1 via the signal terminal 21 two-level output signals supplied by an output signal generating circuit (not shown). The output buffer 2b is set in a high-impedance state by the output signal generating circuit while no output data is transmitted.

When the electronic appliances 1 and 2 are not connected together physically by the signal line 7, the signal terminal 11 of the first electronic appliance 1 has a ground level GND. Similarly, even when the electronic appliances 1 and 2 are connected together physically, unless the transistor 24 is conducting, the signal terminal 11 has a ground level GND. When the signal line 7 is connected between the signal terminals 11 and 21 so that the electronic appliances 1 and 2 are connected together physically, and in addition the transistor 24 is conducting so that the pull-up resistor 23 is connected to the supplied voltage line 22, the signal terminal 11 has a level approximately equal to the voltage level Vdd of the supplied voltage line 22.

The buffer 13 compares the level at the signal terminal 11 with a predetermined reference level, and feeds the detection circuit 12 with either a level equal to the predetermined level Vdd or a level equal to the ground level GND. Thus, when the 20 electronic appliances 1 and 2 are connected together physically and the pull-up resistor 23 is connected to the supplied voltage line 22, the detection circuit 12 detects the predetermined level Vdd, and otherwise detects the ground level GND.

During the period in which the detection circuit 12 is detecting the predetermined level Vdd, the electronic appliance 1 performs a predetermined sequence of operations that is associated with the electronic appliance 2; for example, the electronic appliance 1 feeds out a digital signal from the signal terminal 11. The sequence of operations that the electronic appliance 1 performs in association with the electronic appliance 2 is performed sometime from immediately after the voltage level at the signal terminal 11 has turned from the ground level GN) to the predetermined level Vdd until the same voltage level returns to the ground level GND.

The reset circuit 28 of the second electronic appliance 2 monitors the electric power supplied to the second electronic appliance 2 so that, as soon as electric power starts being supplied, it can reset the timer circuit 27 to make it start time measurement. As soon as the timer circuit 27 starts time measurement, it turns the control signal S2 to L level and, a predetermined length of time T0 after the start of the time measurement, it turns the control signal S2 to H level. The various portions of the electronic appliance 2 start operating as soon as they start receiving electric power, but it takes a while for their operation to stabilize. Thus, the predetermined length of time T0 for which the timer circuit 27 is set is so determined as to be longer than the length of time that is required for the stabilization of the operation of all portions of the electronic appliance 2.

The control circuit 25, during the period in which the control signal S2 it receives from the timer circuit 27 is at L level, keeps the control signal S1 it outputs at L level, and, during the period in which the control signal S2 is at H level, keeps the control signal S1 at H level. During the period from the start of the supply of electric power until a predetermined length of time T0 thereafter, the control signal S1 is kept at L level, which is inverted by the inverter circuit 26 to H level and is then fed to the gate terminal 24a of the transistor 24. When the gate terminal 24a has H level, the transistor 24 remains cut off, and hence the pull-up resistor 23 is kept disconnected from the supplied voltage line 22. As a result, even after the electronic appliance 2 has started receiving electric power, no current flows through the pull-up resistor 23, and thus the predetermined level Vdd does not appear on the signal line 7.

The predetermined length of time 7D after the start of the supply of electric power, when the control signal S2 that the timer circuit 27 outputs turns to H level, the control signal S1 that the control circuit 25 outputs turns to H level. The control signal S1, now at H level, is inverted by the inverter circuit 26 to L level, which is fed to the gate terminal 24a of the transistor 24. When the gate terminal 24a has L level, the transistor 24 is kept conducting, and hence the pull-up resistor 23 is kept connected to the supplied voltage source 22. Meanwhile, the supplied voltage line 22 is kept grounded across the path through the pull-up resistor 23, signal terminal 21, signal line 7, signal terminal 11, and pull-down resistor 14. As a result, a current flows through the pull-up resistor 23.

Since, as described previously, the resistance R1 of the pull-down resistor 14 is far higher than the resistance R2 of the pull-up resistor 23 (Expression (1)), the voltage level at the signal terminal 11 is approximately equal to the voltage level Vdd on the supplied voltage line 22. Accordingly, the first electronic appliance 1 recognizes establishment of connection with the second electronic appliance 2 as late as when the timer circuit 27 turns the control signal S2 to H level, i.e. the predetermined length of time T0 after the start of the supply of electric power to the electronic appliance 2. At this time, the electronic appliance 2 is already operating with sufficient stability, and therefore, when the electronic appliance 1 immediately transmits a signal to the electronic appliance 2, the latter can receive the signal without fail.

When the electronic appliance 2 ceases to receive electric power, the transistor 24 becomes cut off, and the voltage level at the signal terminal 11 turns to the ground level GND. On detecting this, the electronic appliance 1 recognizes itself as having been disconnected from the electronic appliance 2, and thus stops performing the sequence of operations associated with the electronic appliance 2. When the electronic appliance 2 starts receiving electric power again, the control circuit 25 performs the same control operation as described hitherto, and thus, the predetermined length of time T0 after the restarting of the supply of electric power, the pull-up resistor 23 is connected to the supplied voltage line 22. As a result, the voltage level fed to the detection circuit 12 turns to the predetermined level Vdd, and thus the electronic appliance 1, recognizing re-establishment of connection with the electronic appliance 2, restarts performing the sequence of operations associated with the electronic appliance 2.

Consequently, even when an error occurs in the electronic appliance 2, simply by stopping the supply of electric power thereto, and thus without the need to remove the signal line 7 from the signal terminal 21 or 11, it is possible to take necessary measures to clear the error. Moreover, after the error has been cleared, simply by restarting the supply of electric power to the electronic appliance 2, it is possible to make the electronic appliance 1 restart the sequence of operations associated with the electronic appliance 2 automatically as soon as the operation of the latter has become sufficiently stable.

When the control signal S3 fed from the outside via the control terminal 29 turns to L level, the control circuit 25 turns the control signal S1 it outputs to L level regardless of the level of the control signal S2 fed from the timer circuit 27. The control signal S1, now at L level, is inverted by the inverter circuit 26 to H level, and is then fed to the gate terminal 24a so as to make the transistor 24 cut off. As a result, the pull-up resistor 23 is disconnected from the supplied voltage line 22, and thus the voltage level on the signal line 7 turns to the ground level GND.

Consequently, even when the electronic appliance 2 is receiving electric power, by feeding an L level control signal S3 thereto from the outside, it is possible, at any time, to make the electronic appliance 1 recognize itself as having been disconnected from the electronic appliance 2. In cases where there is a sequence of operations that the electronic appliance 2 needs to perform while it is not connected to the electronic appliance 1, simply by feeding an L level control signal S3 to the former, it is possible to create a "logically disconnected" state while keeping the electronic appliance 2 "physically connected" to the electronic appliance 1 by the signal line 7.

When the control signal S3 returns to H level, the control circuit 25 restarts its control operation in accordance with the control signal S2 fed from the timer circuit 27. Specifically, when the control signal S2 is still at L level, the control circuit 25 turns the control signal S1 to L level, and, when the control signal S2 is already at H level, it turns the control signal S1 to H level. Normally, the control signal S3 is available only when the electronic appliance 2 is operating stably. Accordingly, as soon as the control circuit 25 ceases to receive the L level control signal S3 from the control terminal 29, the electronic appliances 1 and 2 are brought back into the logically connected state.

Figure 2:
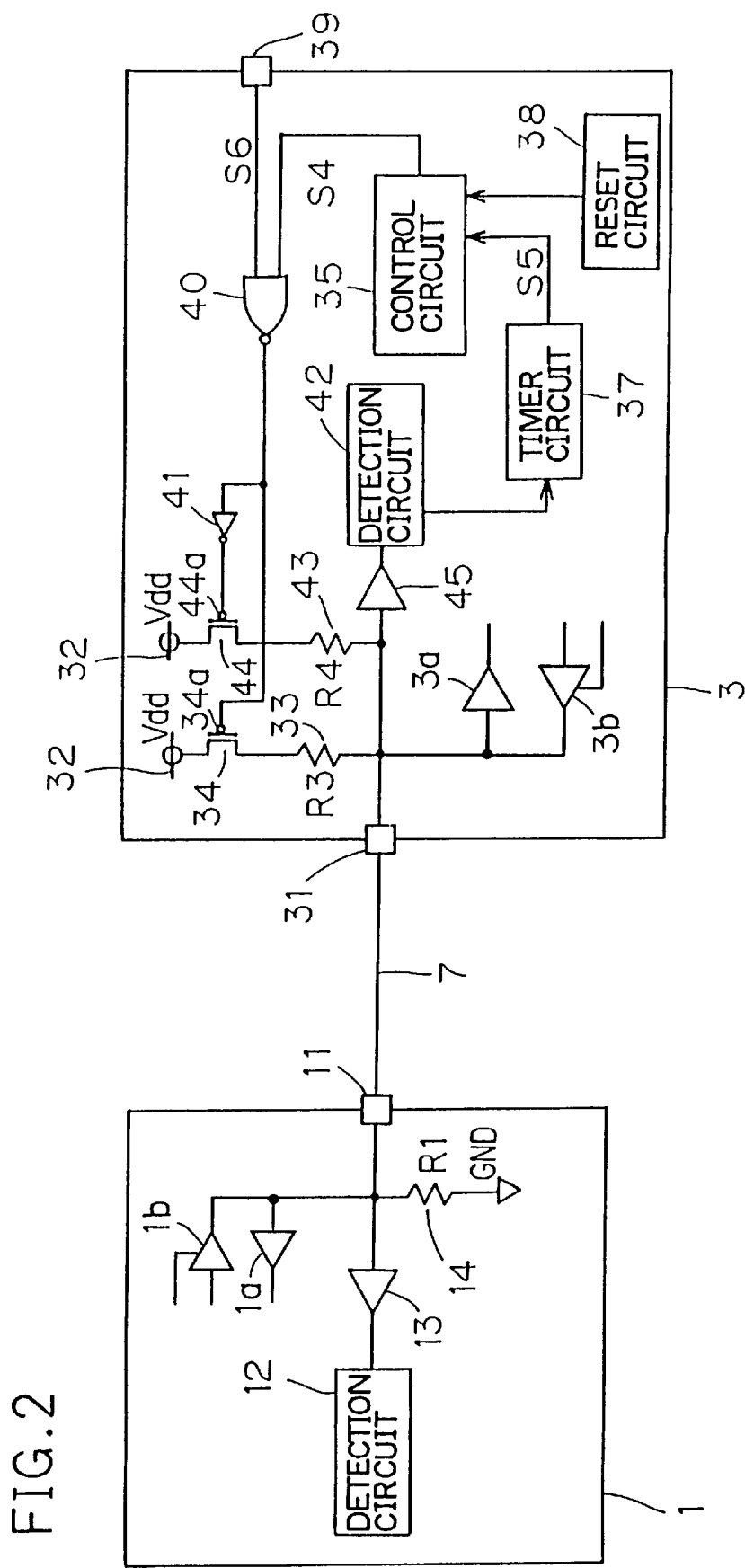
FIG. 2 is a diagram schematically illustrating the outline of the circuit design of the electronic appliance of a second embodiment of the invention.

FIG. 2 shows the outline of the circuit design of the electronic appliance of a second embodiment of the invention. In this embodiment, the circuit design of the second electronic appliance 3 is different from that of the electronic appliance 2 of the previous embodiment; that is, the first electronic appliance 1 has the same circuit design and operates in the same way in both embodiments, and therefore overlapping explanations will not be repeated.

The second electronic appliance 3 has a signal terminal 31 to which the other (i.e. opposite to the first electronic appliance 1) end of the signal line 7 is connected, a supplied voltage line 32 that supplies a voltage having a predetermined voltage level Vdd, two pull-up resistors 33 and 43 that each have one end connected to the signal terminal 31 and have the other end connected to the supplied voltage line 32, and two field-effect transistors 34 and 44 that are connected between the supplied voltage line 32 and the pull-up resistors 33 and 43, respectively. The pull-up resistors 33 and 43 are connected to the supplied voltage line 32 only when the transistors 34 and 44, respectively, are conducting.

The resistance R3 of the pull-up resistor 33 is set to be far lower than the resistance R1 of the pull-down resistor 14 of the first electronic appliance 1, and the resistance R4 of the pull-up resistor 43 is set to be far higher than the resistance R1 of the pull-down resistor 14, such that $$R4 \gg R1 \gg R3 \tag{2}$$

The electronic appliance 3 further has a control circuit 35 that controls the operation of the transistors 34 and 44 by feeding thereto a control signal S4, a timer circuit 37 that feeds the control circuit 35 with a control signal S5 that determines the timing with which the control circuit 35 performs its control operation, a reset circuit 38 that instructs the control circuit 35 to initialize its control operation, a control terminal 39 for receiving a control signal S6 fed from the outside, a NAND gate circuit 40 that calculates the logical AND between the control signal S4 fed from the control circuit 35 and the control signal S6 fed from the outside and feeds the logical NOT of the calculated result to the gate terminals 34a and 44a of the transistors 34 and 44, and an inverter circuit 41 that inverts the level of the output of the NAND gate circuit 40 that is fed to the gate terminal 44a of the transistor 44. Each of the control signals S4, S5, and S6 takes either a high level (H level) or a low level (L level) at a time. Normally, the control signal S6 is kept at H level.

The electronic appliance 3 further has a detection circuit 42 that monitors the voltage level at the signal terminal 31 and, in accordance with the detected voltage level, instructs the timer circuit 37 to start its operation, and a buffer 45 that transmits the voltage level at the signal terminal 31 to the detection circuit 42. An input buffer 3a and an output buffer 3b, which are similar to the input buffer 2a and the output buffer 2b of the electronic appliance 2 in the previous embodiment, are also provided to the electronic appliance 3. The buffer 45 has a circuit configuration similar to that of the buffer 13 of the electronic appliance 1. The detection circuit 42, when the voltage level detected at the signal terminal 31 is equal to the predetermined level Vdd, recognizes that the electronic appliance 3 is not connected to the electronic appliance 1, and, when the voltage level detected at the signal terminal 31 is equal to the ground level GND, recognizes that the electronic appliance 3 is connected to the electronic appliance 1. When the voltage level at the signal terminal 31 turns to the ground level GND, the detection circuit 42 resets the timer circuit 37 to make it start time measurement.

The reset circuit 38 monitors the electric power supplied to the second electronic appliance 3 so that, as soon as electric power starts being supplied, it can make the control circuit 35 start its control operation. When the control circuit 35 starts its control operation in response to the instruction from the reset circuit 38, it turns the control signal S4 to L level. On receiving this control signal S4, the NAND gate circuit 40 turns its output to H level, which is, on the one hand, fed to the gate terminal 34a of the transistor 34 and, on the other, inverted by the inverter circuit 41 to L level and then fed to the gate terminal 44a of the transistor 44.

The transistor 34, which receives H level at its gate terminal 34a, remains cut off, and thus the pull-up resistor 33 is not connected to the supplied voltage line 32. On the other hand, the transistor 44, which receives L level at its gate terminal 44a, starts conducting, and thus the pull-up resistor 43 is connected to the supplied voltage line 32.

In this state, unless the signal line 7 is connected between the signal terminals 11 and 31, the voltage level at the signal terminal 31 remains equal to the predetermined level Vdd. As long as the control circuit 42 continues to detect this state, it gives no instruction to the timer circuit 37. On the other hand, the electronic appliance 1 detects the ground level GND, and thus recognizes that it is not connected to the electronic appliance 3.

When the electronic appliances 1 and 3 are already connected together physically by the signal line 7, or when the electronic appliances 1 and 3 get connected together by the signal line 7 after the pull-up resistor 43 has been connected to the supplied voltage line 32, the supplied voltage line 32 is grounded across the path through the pull-up resistor 43, signal terminal 31, signal line 7, signal terminal 11, and pull-down resistor 14. As a result, a current flows through the pull-up resistor 43.

Since, as described previously, the resistance R4 of the pull-up resistor 43 is far higher than the resistance Ri of the pull-down resistor 14 (Expression (2)), the voltage level at the signal terminal 11 and at the signal terminal 31 is approximately equal to the ground level GND. At this time, the first electronic appliance 1 recognizes that the second electronic appliance 3 is not connected thereto.

The detection circuit 42 of the electronic appliance 3, when the voltage level it monitors turns to the ground level GND, makes the timer circuit 37 start time measurement. After starting the time measurement, the timer circuit 37, just as in the first embodiment, keeps the control signal S5 at L level for a predetermined length of time T0 that is set to be longer than the length of time required for the stabilization of the operation of all portions of the electronic appliance 3, and then, after the predetermined length of time ID, turns the control signal S5 to H level.

The control circuit 35, during the period in which the control signal S5 it receives from the timer circuit 37 is at L level, turns the control signal S4 it outputs to L level, and, during the period in which the control signal S5 is at H level, turns the control signal S4 to H level. Accordingly, the control circuit 35, which turns the control signal S4 to L level on starting its operation, does not turn the control signal S4 to H level until the predetermined length of time T0 has elapsed.

As long as there is no input to the control terminal 39, i.e. as long as the control signal S6 is at H level, when the control circuit 35 turns the control signal S4 to H level, the NAND gate circuit 40 turns its output level to L level, i.e. inverts its output level. Thus, the transistor 34, which now receives L level at its gate terminal 34a, starts conducting, and the transistor 44, which now receives H level at its gate terminal 44a, becomes cut off.

This causes the pull-up resistor 33 to be connected to the supplied voltage line 32 and the pull-up resistor 43 to be disconnected from the supplied voltage line 32. Thus, the supplied voltage line 32 is grounded across the path through the pull-up resistor 33, signal terminal 31, signal line 7, signal terminal 11, and pull-down resistor 14. As a result, a current flows through the pull-up resistor 33.

Since, as described previously, the resistance Ri of the pull-down resistor 14 is far higher than the resistance R3 of the pull-up resistor 33 (Expression (2)), the voltage level at the signal terminal 11 and at the signal terminal 31 is approximately equal to the predetermined level Vdd. At this time, the first electronic appliance 1 recognizes that the second electronic appliance 3 is connected thereto. On the other hand, the detection circuit 42, even when the level at the signal terminal 31 turns from the ground level GND to a level approximately equal to the predetermined level Vdd, does not reset the timer circuit 37, and thus the electronic appliances 1 and 3 are kept in a logically connected state.

When the control signal S6 fed from the outside via the control terminal 39 turns to L level, the NAND gate circuit 40 turns its output to H level irrespective of the level of the control signal S4. At this time, the transistor 34 becomes cut off, and the transistor 44 starts conducting, causing only the pull-up resistor 43 to be connected to the supplied voltage line 32. In this state, the voltage level at the signal terminal 11 and at the signal terminal 31 is approximately equal to the ground level GND, and thus the electronic appliance 1 recognizes that the electronic appliance 3 has been disconnected therefrom.

The detection circuit 42, when the voltage level it monitors turns to the ground level GND, resets the timer circuit 37 to make it restart time measurement. The timer circuit 37 keeps the control signal S5 at L level for a predetermined length of time T0, and then, after the predetermined length of time T0, turns the control signal S5 to H level. As a result, the control signal S4 that the control circuit 35 outputs remains at L level during the predetermined length of time T0, and then, after the predetermined length of time T0, turns to H level.

The NAND gate circuit 40, which receives the control signal S4 from the control circuit 35 and the control signal S6 from the control terminal 39, always keeps its output at H level during the predetermined length of time T0, and then, after the predetermined length of time T0, it either continues to keep its output at H level if the control signal S6 is still at L level, or turns its output to L level if the control signal S6 has returned to H level. That is, when the predetermined length of time T0 has elapsed, and in addition there is no input of an L level control signal S6 from the outside, the pull-up resistor 33 is, instead of the pull-up resistor 43, connected to the supplied voltage line 32. This makes the level at the signal terminal 11 approximately equal to the predetermined level Vdd, and thus the electronic appliance 1 recognizes that the electronic appliance 3 is connected thereto.

Also in this embodiment, the electronic appliance 1 recognizes establishment of connection with the electronic appliance 3 as late as a predetermined length of time 7D after the electronic appliance 3 has started receiving electric power, and thus it is possible to stabilize the operation of the electronic appliance 3 during this predetermined length of time T0. Moreover, by feeding an L level control signal S6 from the outside, it is possible to make the electronic appliance 1 recognize that the electronic appliance 3 is not connected thereto while keeping the electronic appliances 1 and 3 connected together physically by the signal line 7.

Figure 3:
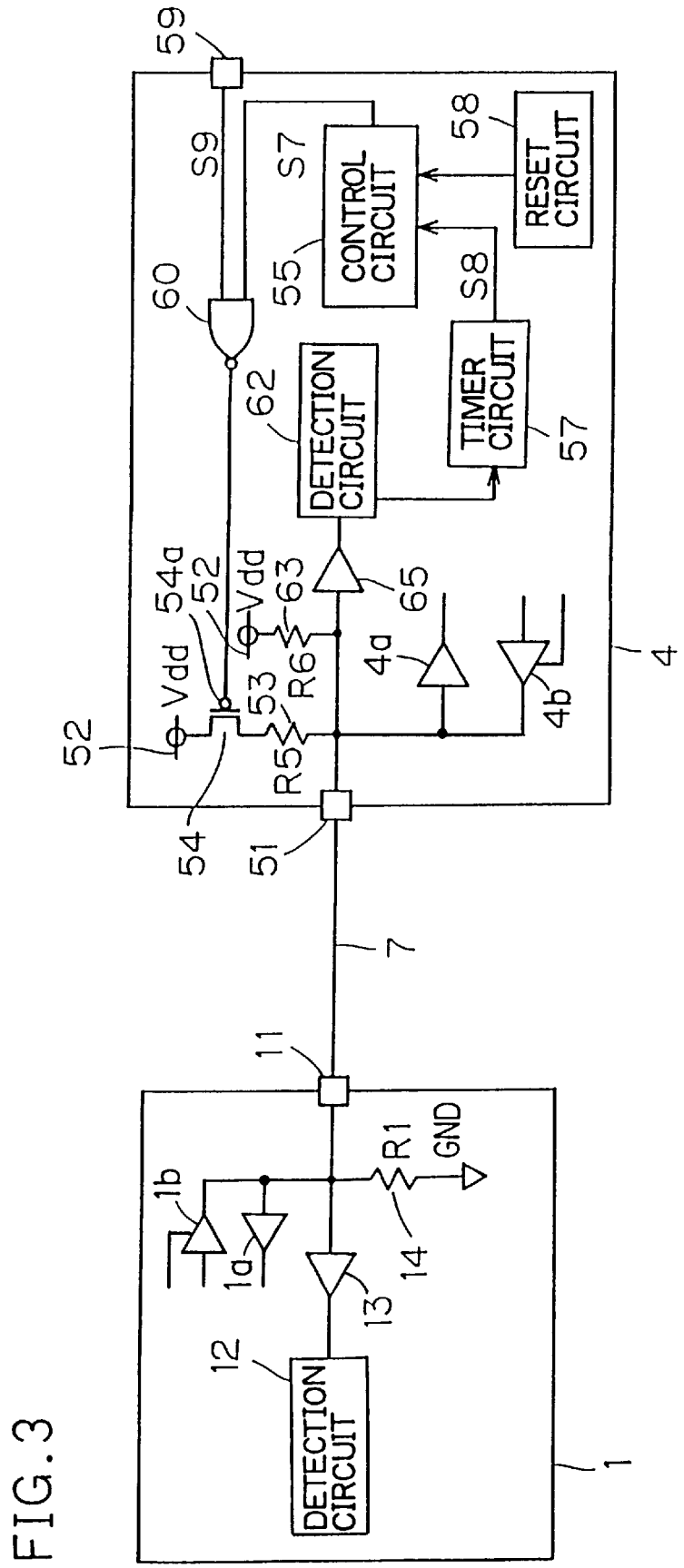
FIG. 3 is a diagram schematically illustrating the outline of the circuit design of the electronic appliance of a third embodiment of the invention.
Figure 4:
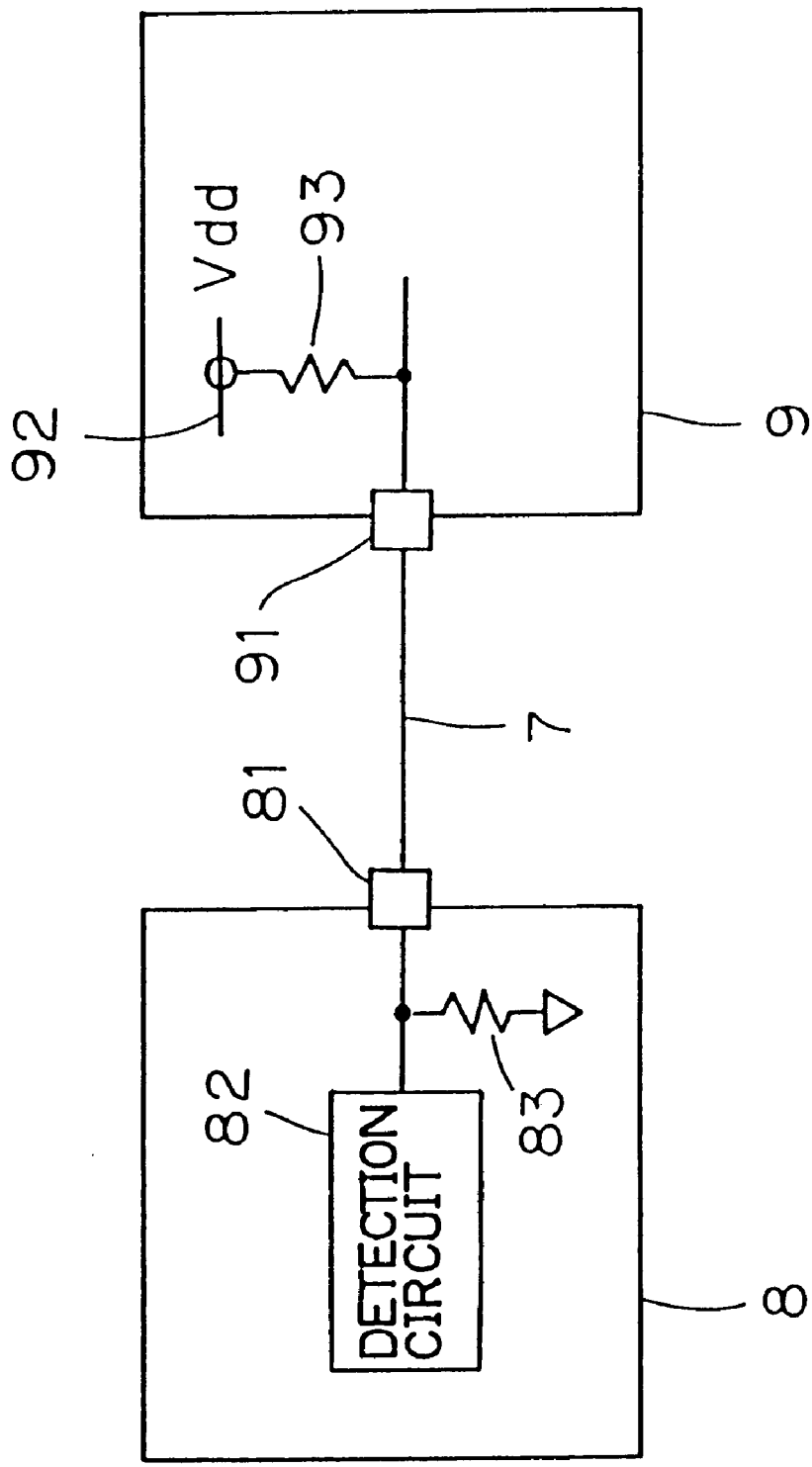
FIG. 4 is a diagram schematically illustrating the outline of the circuit design of a conventional electronic appliance.

FIG. 3 shows the outline of the circuit design of the electronic appliance of a third embodiment of the invention. Here, the first electronic appliance 1 has the same circuit design and operates in the same way as in the first and second embodiments. The second electronic appliance 4 has a signal terminal 51 to which the other (i.e. opposite to the first electronic appliance 1) end of the signal line 7 is connected, a supplied voltage line 52 that supplies a voltage having a predetermined voltage level Vdd, a pull-up resistor 53 that has one end connected to the signal terminal 51 and has the other end connected to the supplied voltage line 52, a pull-up resistor 63 that has one end connected to the signal terminal 51 and has the other end connected to the supplied voltage line 52, and a field-effect transistor 54 that is connected between the supplied voltage line 52 and the pull-up resistor 53.

In comparison with the electronic appliance 3 of the second embodiment, the electronic appliance 4 of this embodiment lacks the transistor 44 and the inverter circuit 41, with the result that the pull-up resistor 63 is constantly kept connected to the supplied voltage line 52. The pull-up resistor 53 is connected to the supplied voltage line 52 only when the transistor 54 is conducting. The resistance R5 of the pull-up resistor 53 is set to be far lower than the resistance R1 of the pull-down resistor 14 of the first electronic appliance 1, and the resistance R6 of the pull-up resistor 63 is set to be far higher than the resistance R1 of the pull-down resistor 14, such that $$R6 \gg R1 \gg R5 \quad (3)$$

The electronic appliance 4 further has a control circuit 55 that controls the operation of the transistor 54 by feeding thereto a control signal S7, a timer circuit 57 that feeds the control circuit 55 with a control signal S8 that determines the timing with which the control circuit 55 performs its control operation, a reset circuit 58 that instructs the control circuit 55 to initialize its control operation, a control terminal 59 for receiving a control signal S9 fed from the outside, a NAND gate circuit 60 that calculates the logical AND between the control signal S7 fed from the control circuit 55 and the control signal S9 fed from the outside and feeds the logical NOT of the calculated result to the gate terminal 54a of the transistor 54, a detection circuit 62 that monitors the voltage level at the signal terminal 51 and, in accordance with the detected voltage level, instructs the timer circuit 57 to start its operation, a buffer 65 that transmits the voltage level at the signal terminal 51 to the detection circuit 62, an input buffer 4a, and an output buffer 4b. These circuits and control signals have the same functions as those of the electronic appliance 3 of the second embodiment, and therefore overlapping explanations will not be repeated.

Since the pull-up resistor 63 is constantly kept connected to the supplied voltage line 52, when the electronic appliances 1 and 4 are not connected together physically by the signal line 7, the voltage level at the signal terminal 51 is equal to the voltage level Vdd on the supplied voltage line 52. At this time, the signal terminal 11 of the electronic appliance 1 has the ground level GND.

When the electronic appliances 1 and 4 are connected together physically, the voltage level at the signal terminal 51 and at the signal terminal 11 varies depending on whether the transistor 54 is conducting or not. The supplied voltage line 52 is grounded across the pass through the pull-up resistor 63, signal terminal 51, signal line 7, signal terminal 11, and pull-down resistor 14. At this time, since the resistances R1 and R6 satisfy Expression (3), unless the transistor 54 is conducting, the voltage level at the signal terminal 51 and at the signal terminal 11 is approximately equal to the ground level GND. When the transistor 54 starts conducting, the supplied voltage line 52 is grounded also across the path through the pull-up resistor 53. At this time, since the resistances R1 and R5 satisfy Expression (3), the voltage level at the signal terminal 51 and at the signal terminal 11 is approximately equal to the predetermined level Vdd. As a result, almost no current flows through the pull-up resistor 63.

As the result of the control circuit 55, timer circuit 57, and detection circuit 62 operating in the same manner as their counterparts in the second embodiment, even after the electronic appliance 1 has been connected to the electronic appliance 4 physically by the signal line 7, it is possible to keep the electronic appliance 1 unaware of establishment of connection with the electronic appliance 4 until the operation of the latter becomes stable. Moreover, by feeding an L level control signal S9 from the outside, it is possible, without the need to remove the signal line 7, to make the electronic appliance 1 recognize that it is not connected to the electronic appliance 4.

In the embodiments described above, the second electronic appliance 2, 3, or 4 has the transistor(s) 24, 34 and 44, or 54 connected between the pull-up resistor(s) 23, 33 and 43, or 53 and the supplied voltage line 22, 32, or 52. However, these transistors may be provided between the corresponding resistor and the corresponding signal terminal 21, 31, or 51. In the embodiments described above, the voltage level Vdd on the supplied voltage line of the second electronic appliance is assumed to be higher than the ground level GND. However, the voltage level Vdd may be set to be lower than the ground level GND. In that case, the resistors 23, 33, 43, 53, and 63 act as pull-down resistors, and the resistor 14 of the first electronic appliance acts as a pull-up resistor.

The circuit design of the electronic appliances 2, 3, and 4 is applicable to any electronic appliance of the type that is connected to another electronic appliance by way of a signal line; examples of such an electronic appliance include electronic devices that support "plug-and-play" or "hot plugging", such as electronic devices having a universal serial bus (USB) interface. "Plug-and-play" refers to the function that allows, for example, a peripheral device for a personal computer system to be automatically configured for particular operation conditions and thus made ready for use when simply the peripheral device is connected to the personal computer proper. "Hot plugging" refers to the function that, in addition to supporting "plug-and-play", allows such a peripheral device to be connected to a main system without once shutting off the supply of electric power to them.

In the above embodiments, the reset circuit and the timer circuit operate together to feed a control signal to the control circuit that controls the transistor that acts as a switch circuit. However, the control of the switch circuit may be performed in any other way. For example, it is also possible to provide only a timer circuit or a reset circuit so that the operation of the transistor can be controlled directly. Alternatively, it is also possible to provide an additional circuit that monitors the condition of the electronic appliance from a different point of view so that the operation of the electronic appliance will be controlled also in accordance with the results of such monitoring.

According to the present invention, even in cases where an electronic appliance is already connected to another electronic appliance physically by a signal line, it is possible to create a state in which the two electronic appliances are recognized as logically disconnected. As a result, it is no longer necessary to bother to connect or remove the signal line physically in order to synchronize the operation of one electronic appliance with that of the other electronic appliance. Moreover, it is possible to allow the other electronic appliance to operate with appropriate timing, and thus it is possible to prevent the loss of signals communicated by way of the signal line and thereby prevent the resulting malfunction.

Obviously, many modifications and variations of the present invention are possible in light of the above teachings. It is therefore to be understood that within the scope of the appended claims, the invention may be practiced other than as specifically described.

What is claimed is:

1. An electronic appliance comprising:
   a voltage line that supplies a voltage having a predetermined level;
   a terminal to which a cable is detachably attached;
   a first switch circuit that is selectively in a conducting state or in a non-conducting state;
   a second switch circuit that is kept in a non-conducting state while said first switch circuit is in the conducting state and that is kept in a conducting state while said first switch circuit is in the non-conducting state;
   a first resistor; and
   a second resistor having a resistance higher than a resistance of said first resistor,
   wherein said first switch circuit and said first resistor are connected to each other in series and are connected to said voltage line at their one end and to said terminal at their other end, and
   wherein said second switch circuit and said second resistor are connected to each other in series and are connected to said voltage line at their one end and to said terminal at their other end.

2. An electronic appliance as claimed in claim 1,
   wherein said electronic appliance receives a signal from another electronic appliance by way of said cable.

3. An electronic appliance as claimed in claim 1, further comprising:
   a detection circuit for monitoring a voltage level at said terminal; and
   a controller for switching the states of said first and second switch circuits in accordance with the voltage level monitored by said detection circuit.

4. An electronic appliance as claimed in claim 3,
   wherein said first and second switch circuits are each composed of a transistor that is in a conducting state when a voltage it is receiving is at a first level and in a non-conducting state when the voltage it is receiving is at a second level, and
   wherein said controller comprises an output circuit for producing a voltage and varying a level thereof between said first and second levels and an inverter for inverting between said first and second levels the level of the voltage produced by said output circuit, the voltage produced by said output circuit being fed to said first switch circuit and the voltage inverted by said inverter being fed to said second switch circuit.

5. An electronic appliance as claimed in claim 3,
   wherein said controller brings said first switch circuit into the non-conducting state and said second switch circuit into the conducting state when said electronic appliance starts receiving electric power, and said controller brings said first switch circuit into the conducting state and said second switch circuit into the nonconducting state a predetermined length of time after a change is detected in the voltage level monitored by said detection circuit.

6. An electronic appliance as claimed in claim 5,
   wherein said controller brings said first switch circuit into the non-conducting state and said second switch circuit into the conducting state in response to an instruction fed from outside said electronic appliance.

7. An electronic appliance as claimed in claim 6,
   wherein, while said controller is receiving said instruction, said controller keeps said first switch circuit in the non-conducting state and said second switching circuit in the conducting state, and, when said controller ceases to receive said instruction, said controller brings said first switch circuit into the conducting state and said second switch circuit into the non-conducting state as soon as a predetermined length of time has elapsed after receipt of said instruction.

8. An electronic appliance comprising:

a voltage line that supplies a voltage having a predetermined level;

a terminal to which a cable is detachably attached;

a switch circuit that is selectively in a conducting state or in a non-conducting state;

a first resistor; and a second resistor having a resistance higher than a resistance of said first resistor, wherein said switch circuit and said first resistor are connected to each other in series and are connected to said voltage line at their one end and to said terminal at their other end, and wherein said second resistor is connected to said voltage line at its one end and to said terminal at its other end.

9. An electronic appliance as claimed in claim 8, wherein said electronic appliance receives a signal from another electronic appliance by way of said cable.

10. An electronic appliance as claimed in claim 8, further comprising:

a detection circuit for monitoring a voltage level at said terminal; and a controller for switching the state of said switch circuit in accordance with the voltage level monitored by said detection circuit.

11. An electronic appliance as claimed in claim 10, wherein said controller brings said switch circuit into the non-conducting state when said electronic appliance starts receiving electric power, and said controller brings said switch circuit into the conducting state a predetermined length of time after a change is detected in the voltage level monitored by said detection circuit.

12. An electronic appliance as claimed in claim 11, wherein said controller brings said switch circuit into the non-conducting state in response to an instruction fed from outside said electronic appliance.

13. An electronic appliance as claimed in claim 12, wherein, while said controller is receiving said instruction, said controller keeps said switch circuit in the non-conducting state, and, when said controller ceases to receive said instruction, said controller brings said switch circuit into the conducting state as soon as a predetermined length of time has elapsed after receipt of said instruction.

14. An electronic appliance system comprising:

an electronic appliance that comprises a voltage line that supplies a voltage having a predetermined level, a terminal to which a cable is detachably attached, a first switch circuit that is in a conducting state at a time and a non-conducting state at another time, a second switch circuit that is kept in a non-conducting state while said first switch circuit is in the conducting state and that is kept in a conducting state while said first switch circuit is in the non-conducting state, a first resistor and a second resistor having a resistance higher than a resistance of said first resistor, such that said first switch circuit and said first resistor are connected to each other in series and are connected to said voltage line at their one end and to said terminal at their other end, and said second switch circuit and said second resistor are connected to each other in series and are connected to said voltage line at their one end and to said terminal at their other end; and another electronic appliance that has a third resistor connected to said cable and that applies to said third resistor a voltage having a level different from said predetermined level, wherein a resistance of said third resistor is higher than the resistance of said first resistor and lower than the resistance of said second resistor.

15. An electronic appliance system comprising:

an electronic appliance that comprises a voltage line that supplies a voltage having a predetermined level, a terminal to which a cable is detachably attached, a switch circuit that is in a conducting state at a time and in a non-conducting state at another time, a first resistor and a second resistor having a resistance higher than a resistance of said first resistor such that said switch circuit and said first resistor are connected to each other in series and are connected to said voltage line at their one end and to said terminal at their other end, and said second resistor is connected to said voltage line at its one end and to said terminal at its other end; and another electronic appliance that has a third resistor connected to said cable and that applies to said third resistor a voltage having a level different from said predetermined level, wherein a resistance of said third resistor is higher than the resistance of said first resistor and lower than the resistance of said second resistor.

* * * * *